(12) United States Patent
Li et al.

(10) Patent No.: US 11,927,620 B2
(45) Date of Patent: Mar. 12, 2024

(54) METHOD FOR SIMULATING ELECTRICITY OF WAFER CHIP

(71) Applicant: CHANGXIN MEMORY TECHNOLOGIES, INC., Hefei (CN)

(72) Inventors: Hongxiang Li, Hefei (CN); Shih-Shin Wang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 435 days.

(21) Appl. No.: 17/477,792

(22) Filed: Sep. 17, 2021

(65) Prior Publication Data
US 2022/0236317 A1 Jul. 28, 2022

Related U.S. Application Data

(63) Continuation of application No. PCT/CN2021/103927, filed on Jul. 1, 2021.

(30) Foreign Application Priority Data

Jan. 28, 2021 (CN) .......................... 202110119730.3

(51) Int. Cl.
G01R 31/28 (2006.01)
G06F 16/21 (2019.01)
G06F 30/36 (2020.01)
H01L 21/66 (2006.01)

(52) U.S. Cl.
CPC ......... *G01R 31/2831* (2013.01); *G06F 16/21* (2019.01); *G06F 30/36* (2020.01); *H01L 22/00* (2013.01)

(58) Field of Classification Search
CPC ..... G01R 31/2831; G06F 16/21; G06F 30/36; H01L 22/00
See application file for complete search history.

(56) References Cited

U.S. PATENT DOCUMENTS

| 6,008,906 | A  | 12/1999 | Maris  |
|-----------|----|---------|--------|
| 6,211,961 | B1 | 4/2001  | Maris  |
| 7,700,382 | B2 | 4/2010  | Jin    |
| 8,138,582 | B2 | 3/2012  | Jin    |
| 8,185,230 | B2 | 5/2012  | Miller |

(Continued)

FOREIGN PATENT DOCUMENTS

| CN | 1856864 A    |   | 11/2006 |
|----|--------------|---|---------|
| CN | 104750748 A  | * | 7/2015  |

(Continued)

*Primary Examiner* — Michael Lebentritt
(74) *Attorney, Agent, or Firm* — Cooper Legal Group, LLC

(57) ABSTRACT

Provided is a method for simulating electricity of a wafer chip. The method includes: a database is constructed, the database including spectroscopic data of a semiconductor structure of the wafer chip obtained from a target key process, actual electrical data of the wafer chip, and a correspondence between the spectroscopic data and the actual electrical data; the target key process is performed on a target wafer chip to obtain the spectroscopic data of the semiconductor structure of the target wafer chip obtained from the target key process, the spectroscopic data being target spectroscopic data; the electrical data of the target wafer chip is simulated based on the obtained target spectroscopic data and the database, the electrical data being target electrical data.

20 Claims, 7 Drawing Sheets

(56) References Cited

U.S. PATENT DOCUMENTS

| | | | |
|---|---|---|---|
| 8,282,849 B2 | 10/2012 | Morisawa | |
| 10,872,793 B2 | 12/2020 | Wang et al. | |
| 2004/0040001 A1 | 2/2004 | Miller | |
| 2005/0143952 A1* | 6/2005 | Tomoyasu | H01J 37/32935 702/181 |
| 2006/0094131 A1* | 5/2006 | Wang | G03F 7/70558 356/625 |
| 2008/0070327 A1* | 3/2008 | Ogasawara | H01J 37/32963 156/345.25 |
| 2008/0182348 A1 | 7/2008 | Jin | |
| 2009/0253222 A1 | 10/2009 | Morisawa | |
| 2010/0148323 A1 | 6/2010 | Jin | |
| 2010/0245819 A1* | 9/2010 | Li | G01B 11/0641 356/369 |
| 2013/0325760 A1* | 12/2013 | Liu | G06N 20/00 706/12 |
| 2019/0148191 A1 | 5/2019 | Wang et al. | |
| 2020/0006165 A1 | 1/2020 | Turovets | |

FOREIGN PATENT DOCUMENTS

| | | | |
|---|---|---|---|
| CN | 109637945 A | | 4/2019 |
| CN | 109768002 A | | 5/2019 |
| CN | 110383419 A | | 10/2019 |
| CN | 115406377 A | * | 11/2022 |
| TW | 201003812 A | | 1/2010 |

\* cited by examiner

US 11,927,620 B2

METHOD FOR SIMULATING ELECTRICITY OF WAFER CHIP

CROSS-REFERENCE TO RELATED APPLICATIONS(S)

This application is continuation of International Patent Application No. PCT/CN2021/103927, filed on Jul. 1, 2021, which claims priority to Chinese Patent Application No. 202110119730.3, filed on Jan. 28, 2021. The contents of International Patent Application No. PCT/CN2021/103927 and Chinese Patent Application No. 202110119730.3 are hereby incorporated by reference in their entireties.

TECHNICAL FIELD

The application relates to the field of semiconductor device fabrication, and in particular to a method for simulating electricity of a wafer chip.

BACKGROUND

In a semiconductor process, an Optical Critical Dimension (OCD) is typically performed after some target key process steps to detect in real time whether or not an abnormality is present in a resulting semiconductor structure at each process station. The principle of the OCD is that the geometric structural parameter of the semiconductor structure is obtained based on calculation of coupling between a geometric model spectrum and an actual measurement spectrum.

The OCD can only reflect the geometric parameter of the resulting semiconductor structure (such as height, line width, or depth, etc.), and cannot directly obtain an electrical parameter of the resulting semiconductor structure by the OCD. At the same time, due to the instability of a semiconductor process at a microscopic level, the shape of the final semiconductor structure is not fixed, and a relationship between the geometric structural parameter and the electrical parameter obtained from the OCD cannot be determined, so that at present there is no measurement data that can be associated with a linear parameter. If there is a problem with a front-end-of-line, it may only be found at an electrical test phase.

However, the electrical parameters in the existing process can only be measured when the process reaches M0_WAT (a wafer-level reception test of a bottommost metal layer) or a final probe test phase, and it cannot be found in time whether or not an electrical abnormality is caused by the semiconductor structure obtained at a certain process station, so that a subsequent process will still be performed when the electrical abnormality has appeared in the resulting semiconductor structure, leading to a waste of manpower, material resources, and financial resources.

SUMMARY

The application provides a method for simulating electricity of a wafer chip, which includes: a database is constructed, which includes spectroscopic data of a semiconductor structure of the wafer chip obtained from a target key process, actual electrical data of the wafer chip, and a correspondence between the spectroscopic data and the actual electrical data; the target key process is performed on a target wafer chip to obtain the spectroscopic data of the semiconductor structure of the target wafer chip obtained from the target key process, the spectroscopic data being target spectroscopic data; electrical data of the target wafer chip is simulated based on the obtained target spectroscopic data and the database; the electrical data being a target electrical data.

DETAILED DESCRIPTION

Figure 1:
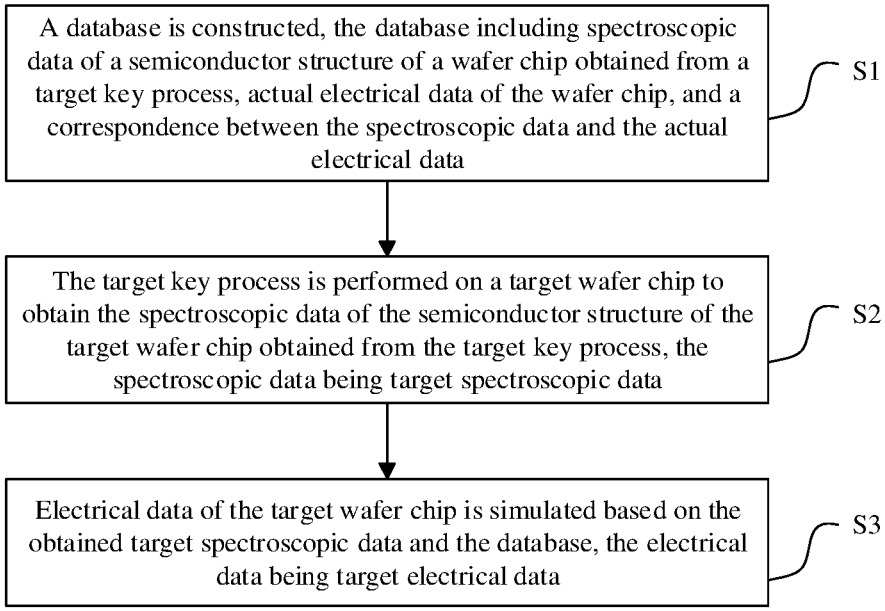
FIG. 1 is a flowchart a method for simulating electricity of a wafer chip in an embodiment.

In order to understand the application, the application will be further described with reference to the related drawings. The embodiments of the application are given in the drawings. However, the application may be implemented in many different forms, and is not limited to the embodiments described herein. Conversely, the purpose of providing these embodiments is to make the understanding of the disclosure of the application more thoroughly.

Unless otherwise defined, the meaning of all technical and scientific terms used herein is the same as the typical understanding of those skilled in the art of this application. The terms used in the specification of the application are for the purpose of describing particular embodiments only and is not intended to limit the application.

In the cases of "include", "have", and "contain" described herein, other components may be included unless a clear defined language is used, such as "only", "consists of only . . . ". Unless mentioned to the contrary, terms in the singular form may include the same terms in the plural form, and the number thereof should not be regarded as one.

An embodiment of the application provides a method for simulating electricity of a wafer chip, as shown in FIG. 1, which includes the following operations.

At S1, a database is constructed, the database including spectroscopic data of a semiconductor structure of a wafer chip obtained from a target key process, actual electrical data of the wafer chip, and a correspondence between the spectroscopic data and the actual electrical data.

At S2, the target key process is performed on a target wafer chip to obtain the spectroscopic data of the semiconductor structure of the target wafer chip obtained from the target key process, the spectroscopic data being target spectroscopic data.

At S3, electrical data of the target wafer chip is simulated based on the obtained target spectroscopic data and the database, the electrical data being target electrical data.

In the above-mentioned method for simulating electricity of a wafer chip, the database that contains the spectroscopic data, the actual electrical data, and the correspondence between the two is constructed in advance, and then in preparation of the wafer chip, the spectroscopic data of the wafer chip after the target key process is especially collected and is imported into the database for matching to obtain the target electrical data, thereby evaluating the electricity of the wafer chip in the preparation, which is beneficial to timely discovery of an electrical abnormality occurred during the preparation of the wafer chip so that the wafer chip may be reworked or scrapped directly, preventing the waste of manpower, material resources, and financial resources caused by subsequent processes.

In the application, the electricity mainly refers to electrical properties closely related to the structure of the wafer chip. For example, the electricity herein may include, but are not limited to, a threshold voltage in a buried gate trench structure mainly related to the value of OCD. When the buried gate trench structure is abnormal, the threshold voltage of the subsequently formed gate structure will not match a preset threshold voltage, resulting in an electrical abnormality occurred in a finally formed product.

At Step S1, referring to FIG. 1, the target key process refers to a process that has a relatively great impact on a particular electrical parameter of the wafer chip. The actual electrical data refers to electrical data measured and obtained after all processes to the wafer chip are completed. In an example, the actual electrical data may be electrical data tested at the probe test phase, or electrical data tested after the process reaches the M0_wat (wafer-level reception test of the bottommost metal layer).

The method of constructing the database includes using a machine learning technology, and collecting the spectroscopic data of the wafer chip after the target key process in the preparation and the actual electrical data of the wafer chip, and then constructing the database according to the correspondence between the two. The larger the number of data (samples) of the wafer chip collected is, the more specific the correspondence between the spectroscopic data and the actual electrical data is. The method of obtaining the spectroscopic data may be the OCD method.

After the database is constructed, it may be used to evaluate on-line the electrical data of the wafer chip after the target key process during the preparation.

Figure 2:
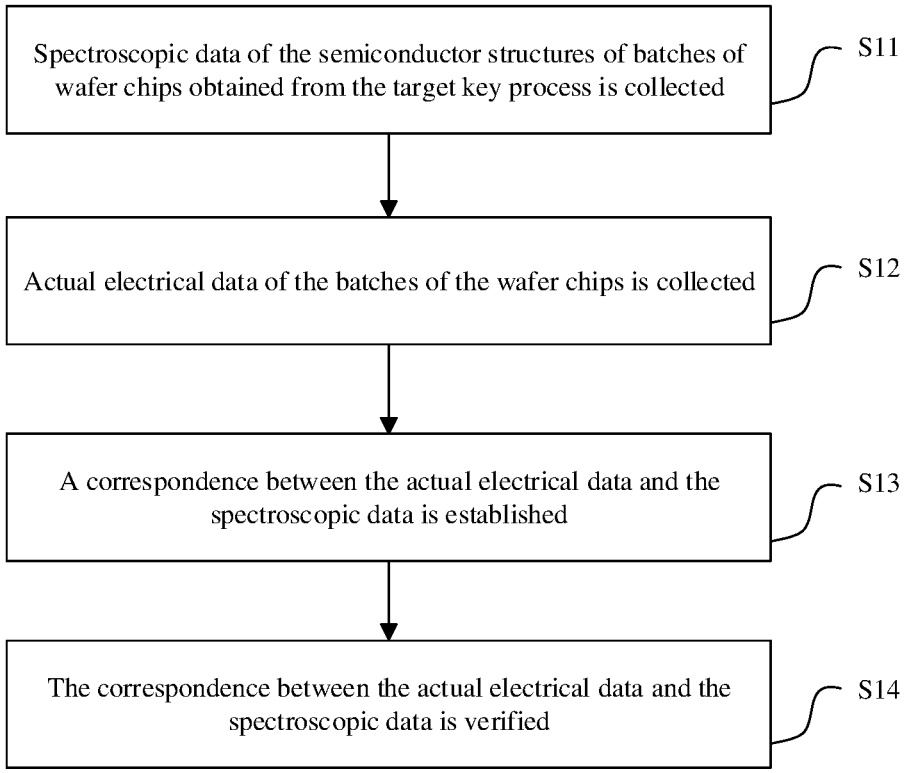
FIG. 2 is a flowchart of a method for constructing a database in an embodiment.

In an example, as shown in FIG. 2, the step of constructing the database includes the following operations.

At S11, spectroscopic data of the semiconductor structures of batches of wafer chips obtained from the target key process is collected.

At S12, actual electrical data of the batches of the wafer chips is collected.

At S13, a correspondence between the actual electrical data and the spectroscopic data is established.

At S14, the correspondence between the actual electrical data and the spectroscopic data is verified.

Figure 3:
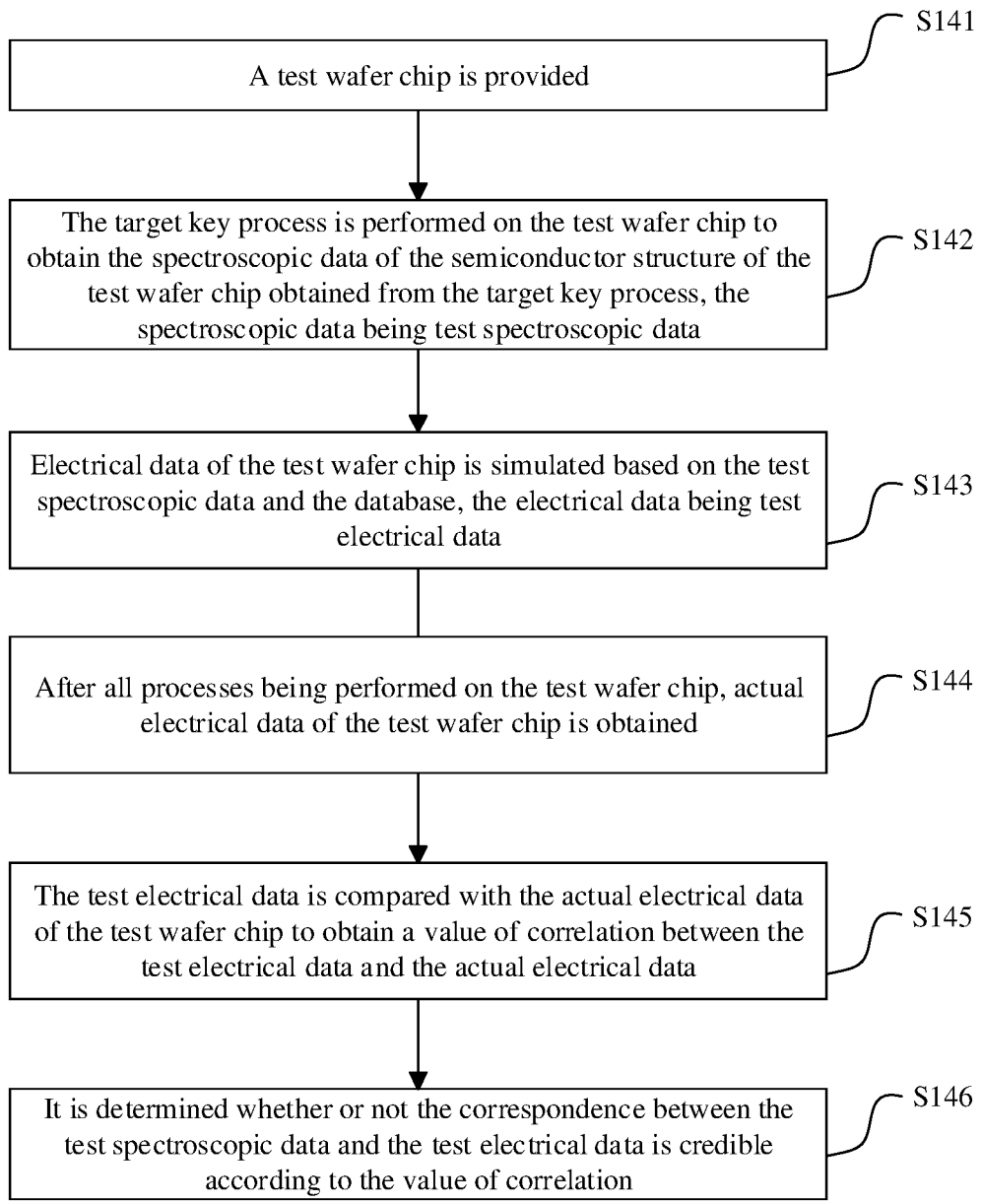
FIG. 3 is a flowchart of a method for verifying whether or not a correspondence between electrical data and spectroscopic data in a database is credible in an embodiment.

S14 may also be divided into the following steps, as shown in FIG. 3, which specifically includes as follows.

At S141, a test wafer chip is provided.

At S142, the target key process is performed on the test wafer chip to obtain the spectroscopic data of the semiconductor structure of the test wafer chip obtained from the target key process, the spectroscopic data being test spectroscopic data.

At S143, electrical data of the test wafer chip is simulated based on the test spectroscopic data and the database, the electrical data being test electrical data.

At S144, after all processes being performed on the test wafer chip, actual electrical data of the test wafer chip is obtained.

At S145, the test electrical data is compared with the actual electrical data of the test wafer chip to obtain a value of correlation between the test electrical data and the actual electrical data.

At S146, it is determined whether or not the correspondence between the test spectroscopic data and the test electrical data is credible according to the value of correlation.

The test wafer chip at S141 may be some wafer chips randomly selected from a normal production process. Process steps performed on the test wafer chip are consistent with those performed on other wafer chips.

At S142, the target key process refers to the process that has a relatively great impact on the particular electrical parameter of the wafer chip. At S142, the operation that the target key process is performed on the test wafer chip to obtain the spectroscopic data of the semiconductor structure obtained of the test wafer chip obtained from the target key process refers to that spectroscopy measurement is performed to obtain the spectroscopic data after the target key process is completed each time. As for a single wafer chip, all the spectroscopic data obtained in the preparation constitutes the test spectroscopic data of the wafer chip.

At S143, the test spectroscopic data obtained is imported into the database to be matched with the spectroscopic data in the database. If the matching succeeds, the corresponding electrical data may be retrieved. Since three elements, which are spectroscopic data, electrical data and the correspondence between the two, are stored in the establishment process of database, when the spectroscopic data is matched successfully, the corresponding electrical data may be simulated. The electrical data is the test electrical data.

At S144 to S146, after the actual electrical data of the test wafer chip is obtained, the test electrical data is compared with the actual electrical data to obtain the value of correlation between the two. A value of correlation between the two higher than a preset level indicates that the correspondence between the test spectroscopic data and the test electrical data is credible, and the electrical data simulated by the database may characterize the actual electrical data of the wafer chip.

In an example, the formula for comparing the test electrical data with the actual electrical data of the test wafer chip to obtain the value of correlation between the test electrical data and the actual electrical data is:

$$R^2 = 1 - \frac{\Sigma(Y_{actual} - Y_{predict})^2}{\Sigma(Y_{actual} - Y_{mean})^2}$$

where $Y_{actual}$ is the actual electrical data, $Y_{predict}$ is the test electrical data, and $Y_{mean}$ is an average value of the actual electrical data. $R^2$ is the value of correlation, and is a value of goodness of fit between the test electrical data and the actual electrical data.

Figure 4:
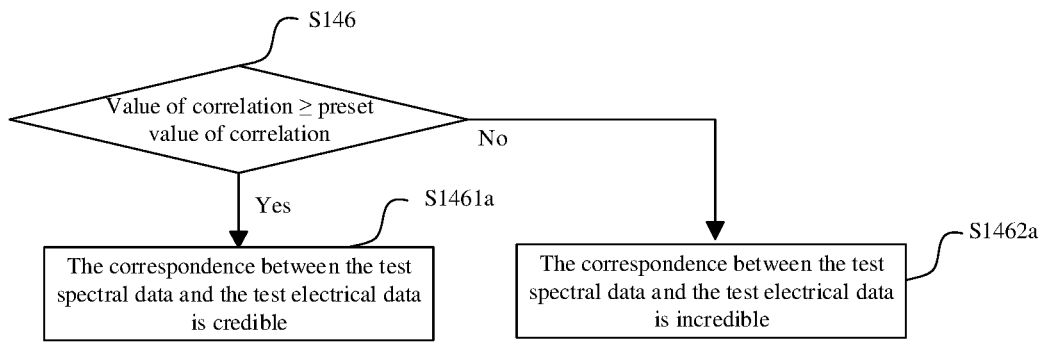
FIG. 4 is a flowchart of a method for determining whether or not a correspondence between test spectroscopic data and test electrical data is credible according to a value of correlation in an embodiment.

In an example, as shown in FIG. 4, the operation of determining whether or not the correspondence between the test spectroscopic data and the test electrical data is credible according to the value of correlation includes the following operations.

At S1461a, the value of correlation being greater than or equal to a preset value of correlation indicates that the correspondence between the test spectroscopic data and the test electrical data is credible.

At S1462a, the value of correlation being less than the preset value of correlation indicates that the correspondence between the test spectroscopic data and the test electrical data is incredible.

The preset value of correlation may be 0.7, or any value from 0.6 to 0.8. In the embodiment, by setting the preset value of correlation, it may be evaluated whether or not there is the value of correlation satisfying requirements between the electrical data simulated with the database and the actual electrical data. Only when the value of correlation between the electrical data simulated with the database and the actual electrical data is high enough, the database is applied to the actual production process of the wafer chip to perform real-time on-line evaluation of the electrical data of the wafer chip obtained from the target key process, so as to discover and deal with the electrical abnormality of the wafer chip occurred during the preparation in time, preventing the waste of manpower, material resources, and financial resources caused by subsequent processes.

Figure 5:
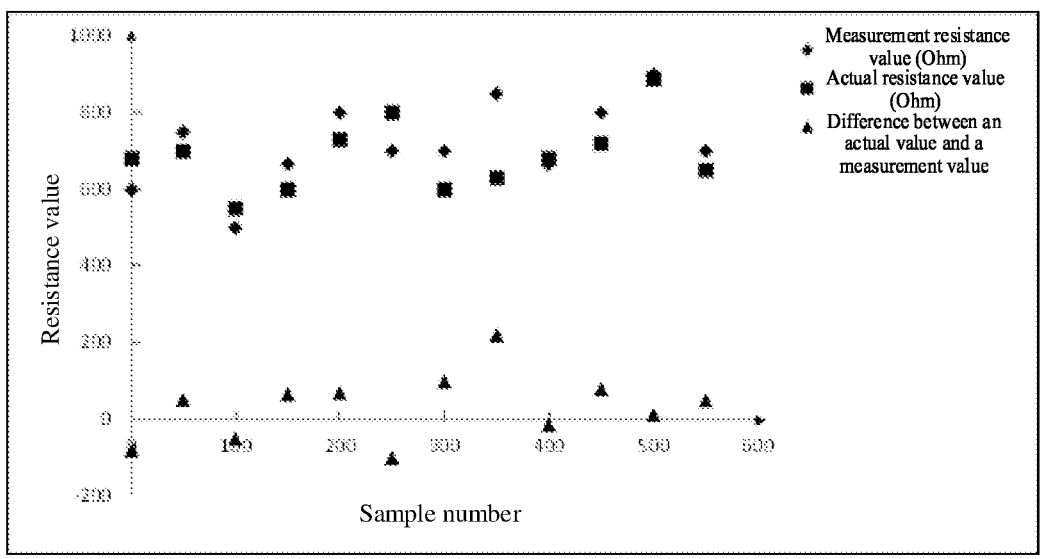
FIG. 5 shows actual electrical data, test electrical data, and differences between the actual electrical data and measured electrical data of different samples in an embodiment.

In an example, the electrical parameter is a resistance value. FIG. 5 shows distribution of the actual electrical data and the test electrical data of some wafer chips. The abscissa refers to serial numbers of the wafer chips, and the ordinate refers to resistance value. A square represents an actual resistance value tested during the probe test phase, a diamond represents a measurement resistance value obtained according to the measurement spectrum and the database, and a triangle represents a difference between the two. In FIG. 5, the smaller the difference between the two, the better the correlation between the two.

Figure 6:
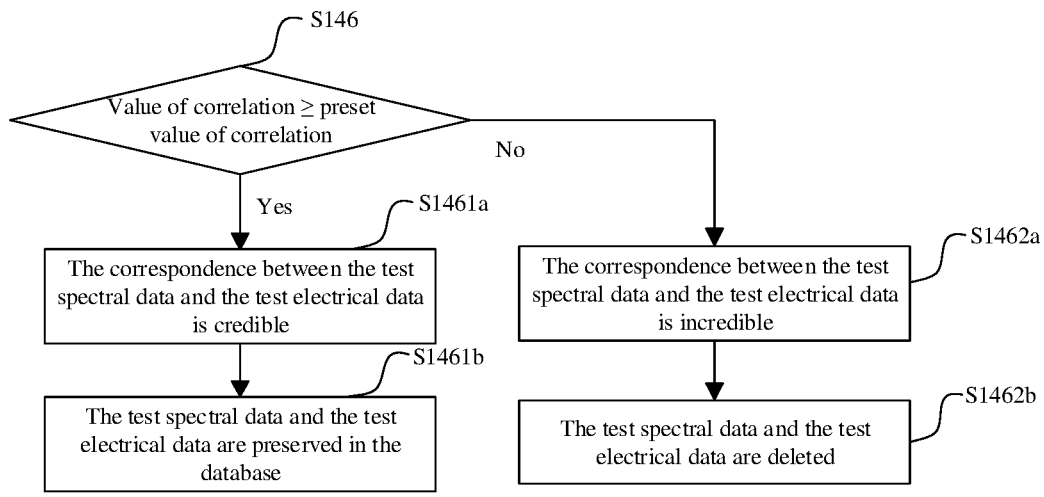
FIG. 6 is a flowchart of a method for determining whether or not a correspondence between test spectroscopic data and test electrical data is credible according to a value of correlation in another embodiment.

In an example, as shown in FIG. 6, the operation of determining whether or not the correspondence between the test spectroscopic data and the test electrical data is credible according to the value of correlation further includes the following operations.

At S1461b, if the correspondence between the test spectroscopic data and the test electrical data is credible, the test spectroscopic data and the test electrical data are preserved in the database.

At S1462b, if the correspondence between the test spectroscopic data and the test electrical data is incredible, the test spectroscopic data and the test electrical data are deleted from the database.

In the embodiment, the number of data in the database may be increased and the types of the spectroscopic data of the wafer chip contained in the database may be enriched by preserving the credible test spectroscopic data and test electrical data. In addition, the method for simulating electricity of a wafer chip in the embodiment may continue to expand new scenes by machine learning, so that the database may more and more clearly and accurately define the correspondences between different spectroscopic data of the semiconductor structure and the electrical data, thereby reducing a possibility of erroneous judgement when the application database is electrically analyzed.

At S2, the target wafer chip is a wafer chip to be evaluated. A certain target key process is performed on the target wafer chip to obtain the spectroscopic data of the target wafer chip, i.e. the target spectroscopic data. The method of obtaining the spectroscopic data of the target wafer chip may also be the OCD method. The target spectroscopic data may reflect three-dimensional feature sizes of the wafer chip after the current process is completed, the three-dimensional feature sizes including the width, the depth, and the line width of the chip structure.

At S3, the target spectroscopic data obtained at S2 is imported in the database established at S1 for matching, so as to check whether or not there is similar or same spectroscopic data in the database. If the matching succeeds, it indicates that a semiconductor structure that is similar to the structure and electricity of the current wafer chip has been presented. A user may obtain the target electrical data according to the matching of the target spectroscopic data, evaluate the electricity of the target wafer chip according to the target electrical data, and determine whether or not the electrical abnormality occurs after the target key process being performed on the wafer chip.

In the above-mentioned method for simulating electricity of a wafer chip, the database that contains the spectroscopic data, the actual electrical data, and the correspondence between the two is constructed in advance, and then in the preparation of the wafer chip, the spectroscopic data of the wafer chip after the target key process is especially collected and is imported into the database for matching, so as to obtain the target electrical data, thereby evaluating the electricity of the wafer chip in the preparation, which is beneficial to timely discovery of an electrical abnormality of the wafer chip occurred during the preparation so that the wafer chip may be reworked or scrapped directly, preventing the waste of manpower, material resources, and financial resources caused by subsequent processes.

In an example, the actual electrical data of the wafer chip is the electrical data of the wafer chip measured after all processes. The actual electrical data may be the electrical data tested at the probe test phase, or the electrical data tested after the process reaches the M0_wat (the wafer-level reception test of the bottommost metal layer).

Figure 7:
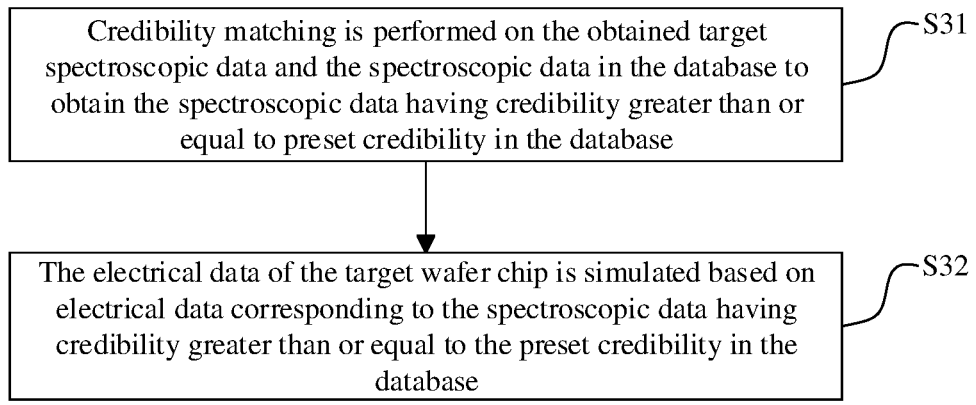
FIG. 7 is a flowchart of a method for simulating electrical data of a target wafer chip based on obtained target spectroscopic data and a database.

In an example, as shown in FIG. 7, the operation of simulating the electrical data of the target wafer chip based on the obtained target spectroscopic data and the database includes the following operations.

At S31, credibility matching is performed on the obtained target spectroscopic data and the spectroscopic data in the database to obtain the spectroscopic data having credibility greater than or equal to preset credibility in the database.

At S32, the electrical data of the target wafer chip is simulated based on electrical data corresponding to the spectroscopic data having credibility greater than or equal to the preset credibility in the database.

Figure 8:
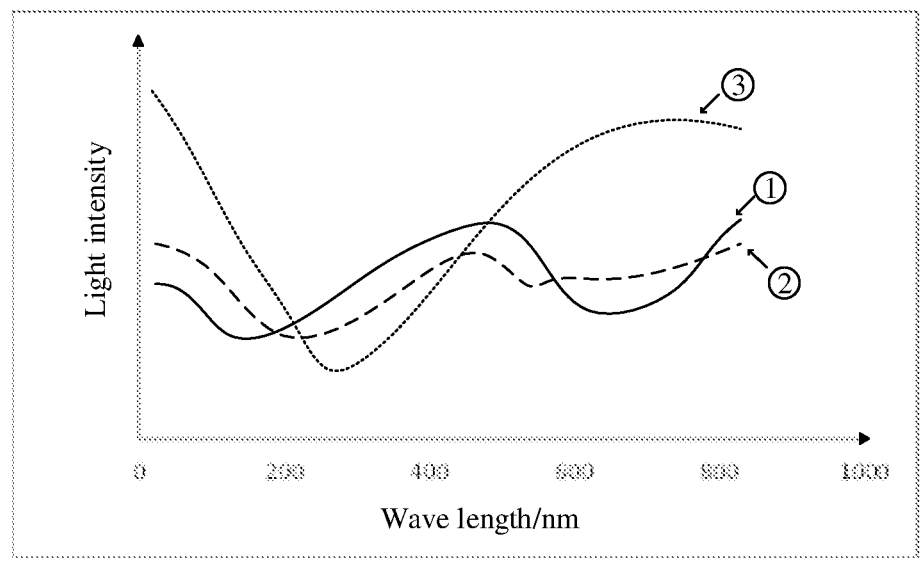
FIG. 8 is a comparison diagram between measurement spectra of a semiconductor structure obtained from two different processes and a spectrum in a database, where curve ① is a spectrum in the database, curve ② is a measurement spectrum of the semiconductor structure obtained from one process, and curve ③ is a measurement spectrum of the semiconductor structure obtained from another process.

At S31, the purpose of performing the credibility matching is to obtain the spectroscopic data that has a sufficiently high similarity from the database. In an actual situation, the spectroscopic data from the semiconductor structure obtained from the current process may not be recorded in the database, and has a extremely large difference with the existing spectroscopic data in the database. Specifically, as shown in FIG. 8, curve ① in FIG. 8 is a spectrum in the database, the spectrum in the database is closest to the spectrum corresponding to the curve ② and the curve ③, the curve ② is a measurement spectrum of the semiconductor structure obtained from a process, and the curve ③ is the measurement spectrum of the semiconductor structure obtained from another process. As can be seen from FIG. 8, the spectrum corresponding to the curve ② is closer to the spectrum corresponding to the curve ①, and the spectrum corresponding to the curve ② and the spectrum corresponding to the curve ① have relatively high credibility, the credibility may be greater than the preset credibility in FIG. 9. The spectrum corresponding to the curve ③ has a relatively large difference from the spectrum corresponding to the curve ①, the spectrum corresponding to the curve and the spectrum corresponding to the curve ① have relatively low credibility, and the credibility may be less than the preset credibility in FIG. 9. In this case, if a certain standard is not set, the spectroscopic data that is matched from the database will be inevitably inaccurate, then the electrical data obtained by simulation according to the spectroscopic data matched do not inevitably and accurately reflect the real electricity of the current semiconductor structure, thereby causing misjudgment. Therefore, it is necessary to set the preset credibility when the matching of the spectroscopic data is performed. Only when the credibility is greater than or equal to the preset credibility, may it be considered that the spectroscopic data is matched successfully. In FIG. 8, it may be considered that the spectrum corresponding to the curve ③ fails to match the spectrum in the database, and the spectrum corresponding to the curve ② is successfully matched with the spectrum in the database.

Figure 9:
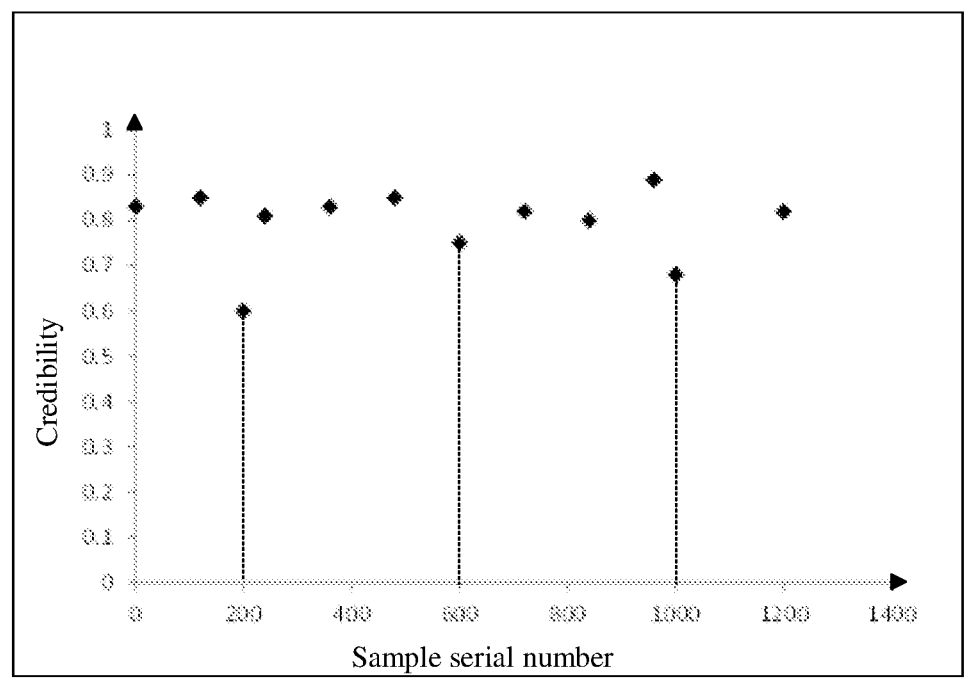
FIG. 9 shows credibility of spectroscopic data in different samples and spectroscopic data in database in an embodiment.

At S32, according to the spectroscopic data successfully matched at S31, the electrical data corresponding to the spectroscopic data is retrieved from the database, then the electricity corresponding to the semiconductor structure obtained in the current process is known. Exemplarily, the preset credibility may has a value set to 0.8, or greater than 0.8 and less than or equal to 1. The preset credibility equal to 0.8 is taken as an example. FIG. 9 shows matching results of spectroscopic data of several wafer chips. The abscissa refers to sample serial number, and the ordinate refers to credibility. In FIG. 9, the credibility of the spectroscopic data whose sample serial numbers are 200, 600, and 1000 is less than 0.8, which do not meet the requirement of the credibility, and thus it is unable to be successfully matched with the spectroscopic data in the database. The credibility of the spectroscopic data represented by other sample serial numbers is greater than or equal to 0.8, and thus it may be successfully matched with the spectroscopic data that has a sufficiently high similarity in the database.

Figure 10:
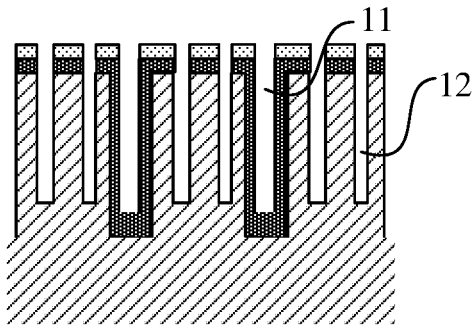
FIG. 10 is a buried gate trench structure of a wafer chip obtained from etching in an embodiment.

In an example, the semiconductor structure of the wafer chip obtained from the target key process includes a buried gate trench structure of the wafer chip obtained from etching. When the buried gate trench structure is abnormal, a subsequently formed gate structure may have a problematic threshold voltage, resulting a problem in a finally formed product. In one or more embodiments, an interconnect via or a shallow trench structure may also be included. A conventional method for measuring the spectroscopic data is the OCD. The principle of the OCD is that the geometric structural parameter of the measured semiconductor structure is obtained based on calculation of coupling between the geometric model spectrum and the actual measurement spectrum. Exemplarily, the OCD measurement method may be used to measure a trench structure 11 and a trench structure 12 in FIG. 10 to obtain parameters, such as the height, the depth, the line width and the like, of the trench structure according to the obtained spectroscopic data.

Figure 11:
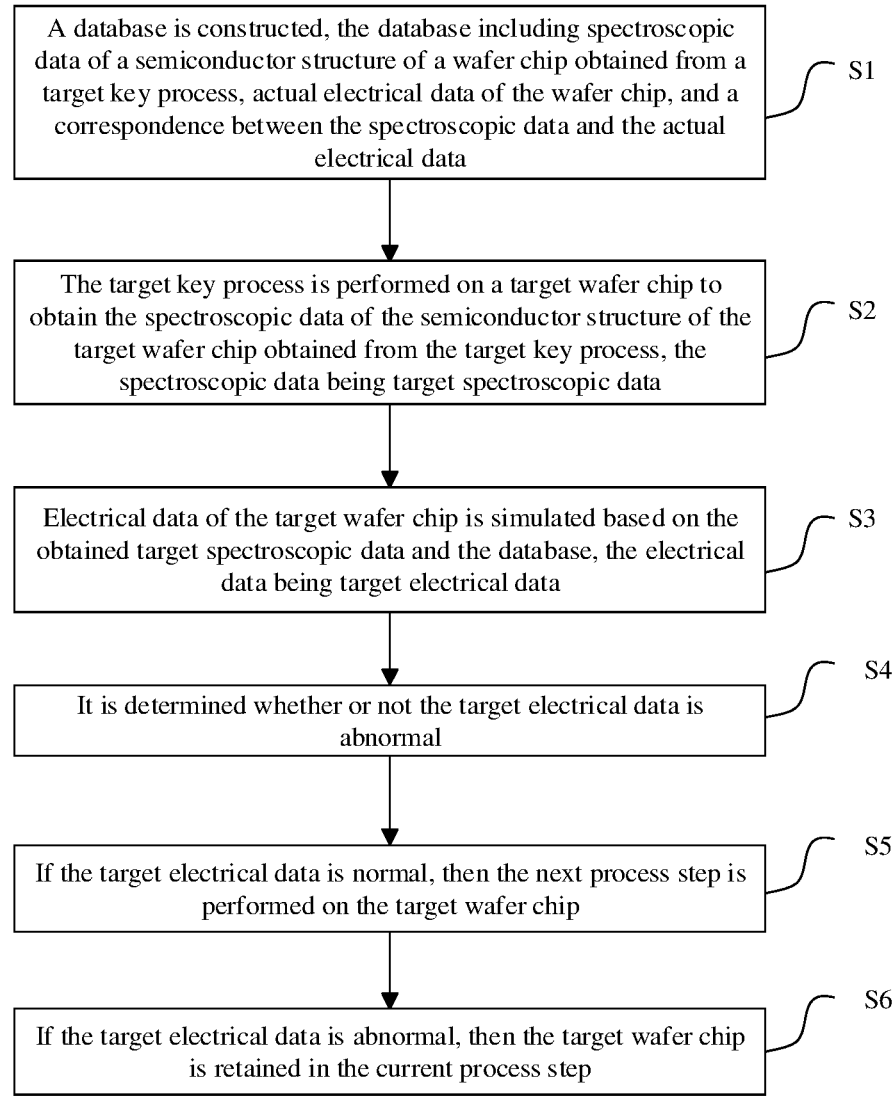
FIG. 11 is a flowchart of a method for simulating electricity of a wafer chip in an embodiment.

In an example, as shown in FIG. 11, the operation after simulating the target electrical data further includes the following operations.

At S4, it is determined whether or not the target electrical data is abnormal.

At S5, if the target electrical data is normal, then the next process step is performed on the target wafer chip.

At S6, if the target electrical data is abnormal, then the target wafer chip is retained in the current process step.

Figure 12:
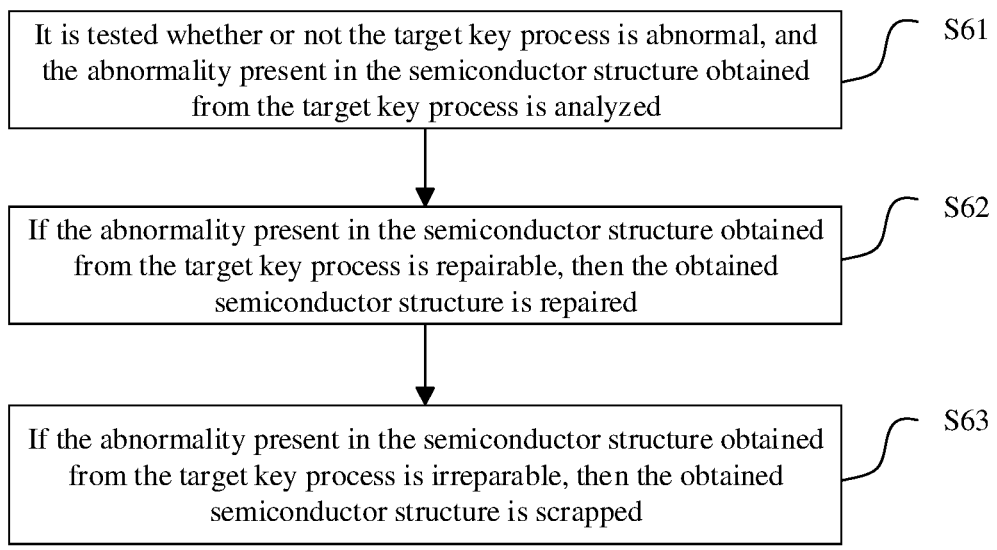
FIG. 12 is a flowchart of a method for processing a target wafer chip that has an abnormality in the simulated electrical data in an embodiment.

In an example, as shown in FIG. 12, if the target electrical data is abnormal, the operation further includes the following operations.

At S61, it is tested whether or not the target key process is abnormal, and the abnormality present in the semiconductor structure obtained from the target key process is analyzed.

At S62, if the abnormality present in the semiconductor structure obtained from the target key process is repairable, then the obtained semiconductor structure is repaired.

At S63, if the abnormality present in the semiconductor structure obtained from the target key process is irreparable, then the obtained semiconductor structure is scrapped.

If the electrical data obtained by simulation displays an abnormality after a certain target key process is performed, then it is tested whether or not there is a problem in the target key process, such as an operational error or a device failure. At the same time, the analysis is performed on the abnormal electrical data to obtain a more detailed abnormal situation report. If the abnormal situation report displays that the currently present electrical abnormality is repairable, then the obtained semiconductor structure is repaired. And, after the reparation of the obtained semiconductor structure is completed, the method for simulating electricity of a wafer chip in above-mentioned embodiment is reused to simulate the electrical data of the wafer chip and evaluate the electricity thereof. If the abnormal situation report displays that the abnormality present in the wafer chip is irreparable, then the wafer chip is directly scrapped and the subsequent process is no longer performed to save resources of human, material and finance.

In an example, after the reparation of the obtained semiconductor structure, the following operations are also included. The spectroscopic data of the repaired semiconductor structure is obtained. The electrical data of the repaired target wafer chip is simulated based on the spectroscopic data of the obtained repaired semiconductor structure and the database. It is determined whether or not the electrical data of the repaired target wafer chip is abnormal. If the electrical data of the repaired target wafer chip is normal, then the next process step is performed on the repaired target wafer chip. If the electrical data of the repaired target wafer chip is abnormal, then the repaired target wafer chip continues to be retained in the current process step. It is tested whether or not the reparation process is abnormal, and the abnormality present in the repaired semiconductor structure is analyzed. If the abnormality present in the repaired semiconductor structure is repairable, then the repaired semiconductor structure is repaired again. If the abnormality of the repaired semiconductor structure is irreparable, then the repaired semiconductor structure is scrapped.

In an example, the operation of repairing the repaired semiconductor structure again further includes: the steps in the previous example are repeated at least once, until the electrical data of the repaired target wafer chip is normal.

The various technical features of the above-mentioned embodiments may be arbitrarily combined. For brevity of description, not all of possible combinations of various technical features in the above-mentioned embodiments were described, however, as long as there is no contradiction in these technical features, it should be considered as the scope of this specification.

The above-mentioned embodiments are merely expressed in several embodiments of the application, which are specific and detailed, but it should not to be construed as limiting the application. It is to be pointed out that for those of ordinary skill in the art, several improvements and modifications can be made without departing from the principle of this application, and these improvements and modifications belong to the scope of protection of this application. Therefore, the protection scope of the application should be subject to the protection scope defined by the claims.

What is claimed is:

1. A method for simulating electricity of a wafer chip, comprising:
   constructing a database, the database comprising spectroscopic data of a semiconductor structure of the wafer chip obtained from a target key process, actual electrical data of the wafer chip, and a correspondence between the spectroscopic data and the actual electrical data,
   performing the target key process on a target wafer chip to obtain the spectroscopic data of the semiconductor structure of the target wafer chip obtained from the target key process, the spectroscopic data being target spectroscopic data; and
   simulating electrical data of the target wafer chip based on the obtained target spectroscopic data and the database, the electrical data being target electrical data.

2. The method for simulating electricity of a wafer chip of claim 1, wherein the actual electrical data of the wafer chip is measured electrical data of the wafer chip after all processes.

3. The method for simulating electricity of a wafer chip of claim 2, wherein constructing the database comprises:
   collecting spectroscopic data of semiconductor structures of a plurality of batches of wafer chips obtained from the target key process;
   collecting actual electrical data of the batches of wafer chips;
   establishing the correspondence between the actual electrical data and the spectroscopic data; and
   verifying the correspondence between the actual electrical data and the spectroscopic data.

4. The method for simulating electricity of a wafer chip of claim 3, wherein verifying the correspondence between the actual electrical data and the spectroscopic data comprises:
   providing a test wafer chip;
   performing the target key process on the test wafer chip to obtain spectroscopic data of the semiconductor structure of the test wafer chip obtained from the target key process, the spectroscopic data being test spectroscopic data;
   simulating electrical data of the test wafer chip based on the test spectroscopic data and the database, the electrical data being test electrical data;
   obtaining actual electrical data of the test wafer chip of the test wafer chip after all processes;
   comparing the test electrical data with the actual electrical data of the test wafer chip to obtain a value of correlation between the test electrical data and the actual electrical data; and
   determining whether or not the correspondence between the test spectroscopic data and the test electrical data is credible according to the value of correlation.

5. The method for simulating electricity of a wafer chip of claim 4, wherein a formula for comparing the test electrical data with the actual electrical data of the test wafer chip to obtain the value of correlation between the test electrical data and the actual electrical data is:

$$R^2 = 1 - \frac{\Sigma(Y_{actual} - Y_{predict})^2}{\Sigma(Y_{actual} - Y_{mean})^2}$$

where $Y_{actual}$ is the actual electrical data, $Y_{predict}$ is the test electrical data, $Y_{mean}$ is an average value of the actual electrical data, and $R^2$ is the value of correlation.

6. The method for simulating electricity of a wafer chip of claim 4, wherein determining whether or not the correspondence between the test spectroscopic data and the test electrical data is credible according to the value of correlation comprises:
   in a case where the value of correlation is greater than or equal to a preset value of correlation, determining that the correspondence between the test spectroscopic data and the test electrical data is credible; and
   in a case where the value of correlation is less than the preset value of correlation, determining that the correspondence between the test spectroscopic data and the test electrical data is incredible.

7. The method for simulating electricity of a wafer chip of claim 6, wherein the preset value of correlation is 0.7.

8. The method for simulating electricity of a wafer chip of claim 4, wherein determining whether or not the correspondence between the test spectroscopic data and the test electrical data is credible according to the value of correlation further comprises:
   in a case where the correspondence between the test spectroscopic data and the test electrical data is credible, preserving the test spectroscopic data and the test electrical data in the database; and
   in a case where the correspondence between the test spectroscopic data and the test electrical data is incredible, deleting the test spectroscopic data and the test electrical data from the database.

9. The method for simulating electricity of a wafer chip of claim 1, wherein simulating the electrical data of the target wafer chip based on the obtained target spectroscopic data and the database comprises:
   performing credibility matching between the obtained target spectroscopic data and the spectroscopic data in the database to obtain the spectroscopic data having credibility greater than or equal to preset credibility in the database; and
   simulating the electrical data of the target wafer chip based on electrical data corresponding to the spectroscopic data having credibility greater than or equal to the preset credibility in the database.

10. The method for simulating electricity of a wafer chip of claim 9, wherein a value of the preset credibility is 0.8.

11. The method for simulating electricity of a wafer chip of claim 1, wherein the semiconductor structure of the wafer chip obtained from the target key process comprises:
    a buried gate trench structure of the wafer chip obtained from etching.

12. The method for simulating electricity of a wafer chip of claim 11, wherein the spectroscopic data comprises optical critical dimension data.

13. The method for simulating electricity of a wafer chip of claim 1, after simulating the target electrical data, further comprising:
    determining whether or not the target electrical data is abnormal;
    in a case where the target electrical data is normal, performing a next process step on the target wafer chip; and
    in a case where the target electrical data is abnormal, retaining the target wafer chip in a current process step.

14. The method for simulating electricity of a wafer chip of claim 13, wherein if the target electrical data is abnormal, further comprising:
    testing whether or not the target key process is abnormal, and analyzing an abnormality present in the semiconductor structure obtained from the target key process;
    repairing the obtained semiconductor structure obtained in a case where the abnormality present in the semiconductor structure obtained from the target key process is repairable; and
    scrapping the semiconductor structure obtained in a case where the abnormality present in the semiconductor structure obtained from the target key process is irreparable.

15. The method for simulating electricity of a wafer chip of claim 14, after repairing the abnormality of the obtained semiconductor structure, further comprising:
    obtaining the spectroscopic data of the repaired semiconductor structure;
    simulating electrical data of a repaired target wafer chip based on the spectroscopic data of the obtained repaired semiconductor structure and the database;
    determining whether or not the electrical data of the repaired target wafer chip is abnormal;
    performing a next process step to the repaired target wafer chip in a case where the electrical data of the repaired target wafer chip is normal;
    retaining the repaired target wafer chip in a current process step in a case where the electrical data of the repaired target wafer chip is abnormal;
    testing whether or not the repair process is abnormal, and analyzing the abnormality present in the repaired semiconductor structure;
    repairing the repaired semiconductor structure again in a case where the abnormality present in the repaired semiconductor structure is repairable; and
    scrapping the repaired semiconductor structure in a case where the abnormality present in the repaired semiconductor structure is irreparable.

16. The method for simulating electricity of a wafer chip of claim 15, after repairing the repaired semiconductor structure again, further comprising:
    repeating the steps in claim 15 at least once, until the electrical data of the repaired target wafer chip is normal.

17. The method for simulating electricity of a wafer chip of claim 2, wherein the measured electrical data of the wafer chip comprises at least one of: electrical data measured at a probe test phase, or electrical data measured at wafer-level reception test of a bottommost metal layer.

18. The method for simulating electricity of a wafer chip of claim 2, wherein the actual electrical data comprises an electrical parameter.

19. The method for simulating electricity of a wafer chip of claim 18, wherein the electrical parameter is resistance.

20. The method for simulating electricity of a wafer chip of claim 1, wherein the database is constructed through machine learning.

* * * * *